United States Patent
Noro et al.

(10) Patent No.: US 9,626,285 B2
(45) Date of Patent: Apr. 18, 2017

(54) STORAGE RESOURCE ALLOCATION TO DATAFLOWS BASED ON DATA REQUIREMENTS AND ATTRIBUTES

(71) Applicant: CANON KABUSHIKI KAISHA, Tokyo (JP)

(72) Inventors: Hideo Noro, Tokyo (JP); Masakazu Matsugu, Yokohama (JP); Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 13/963,105

(22) Filed: Aug. 9, 2013

(65) Prior Publication Data
US 2014/0059319 A1 Feb. 27, 2014

(30) Foreign Application Priority Data

Aug. 22, 2012 (JP) .................................. 2012-183597
Aug. 7, 2013 (JP) .................................. 2013-164560

(51) Int. Cl.
G06F 12/02 (2006.01)
G06F 9/50 (2006.01)
G06F 3/06 (2006.01)

(52) U.S. Cl.
CPC .......... *G06F 12/023* (2013.01); *G06F 9/5016* (2013.01); *G06F 3/06* (2013.01); *G06F 2209/506* (2013.01)

(58) Field of Classification Search
CPC ...... G06F 9/455; G06F 9/5077; G06F 9/4856; G06F 2009/45583; G06F 9/5011
See application file for complete search history.

(56) References Cited

U.S. PATENT DOCUMENTS

| | | | | |
|---|---|---|---|---|
| 7,152,157 B2* | 12/2006 | Murphy | ................ | G06F 9/5077 709/221 |
| 7,383,336 B2* | 6/2008 | Strait | ........................ | G06F 9/50 709/226 |
| 7,505,983 B2* | 3/2009 | Wildhagen | ................ | G06F 8/10 707/758 |
| 7,797,395 B1* | 9/2010 | Thakur | ................. | G06F 3/0605 370/229 |
| 7,978,905 B2 | 7/2011 | Yamamoto et al. | | |
| 8,385,631 B2 | 2/2013 | Yamamoto et al. | | |
| 8,391,306 B2 | 3/2013 | Ito et al. | | |
| 8,463,980 B2* | 6/2013 | Post | .................... | G06F 9/45541 711/153 |

(Continued)

OTHER PUBLICATIONS

"A Hands-on Guide to VisiQuest", AccuSoft Corporation, pp. 1-132.

*Primary Examiner* — Benjamin Wu
(74) *Attorney, Agent, or Firm* — Fitzpatrick, Cella, Harper & Scinto

(57) ABSTRACT

There is provided with a resource allocation apparatus. An attribute indicating a requirement for a data storage resource to be allocated to a plurality of data flows to which the attribute is provided beforehand is acquired. A data flow relationship graph indicating a relationship between the plurality of data flows which potentially lead to access contention in the data storage resource is generated. Based on the attribute and the data flow relationship graph, allocation of the data storage resource to the plurality of data flows is determined such that no access contention occurs.

17 Claims, 19 Drawing Sheets

(56) References Cited

U.S. PATENT DOCUMENTS

| | | | |
|---|---|---|---|
| 8,619,566 B2* | 12/2013 | Szymanski | H04W 72/082 370/230 |
| 8,667,329 B2* | 3/2014 | Douros | G06F 9/466 706/45 |
| 8,972,983 B2* | 3/2015 | Li | G06F 9/5066 370/229 |
| 2004/0083187 A1* | 4/2004 | Andreoli | G06Q 50/188 705/80 |
| 2009/0089139 A1* | 4/2009 | Rojas-Cessa | G06Q 10/0631 705/7.12 |
| 2010/0214936 A1 | 8/2010 | Ito et al. | |
| 2010/0215253 A1 | 8/2010 | Yamamoto et al. | |
| 2011/0239224 A1 | 9/2011 | Yamamoto et al. | |
| 2012/0005342 A1* | 1/2012 | Deng | G06F 9/5044 709/225 |
| 2013/0145373 A1 | 6/2013 | Noro et al. | |
| 2014/0059319 A1 | 2/2014 | Noro et al. | |

* cited by examiner

| DATA FLOW | RESOURCE | ATTRIBUTE |
| --- | --- | --- |
| | | DATA SIZE |
| ab | – | Siz1 |
| bc | – | Siz2 |
| cd | – | Siz2 |
| be | – | Siz2 |
| df | – | Siz3 |
| ef | – | Siz1 |
| fg | – | Siz1 |

FIG. 5A
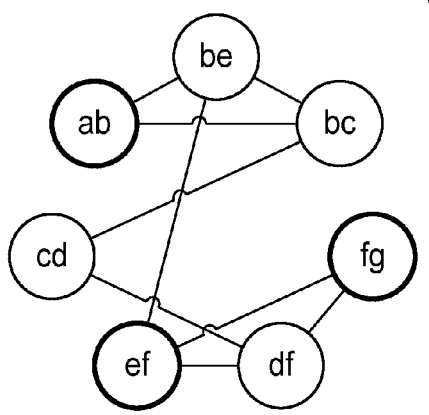
FIG. 5B
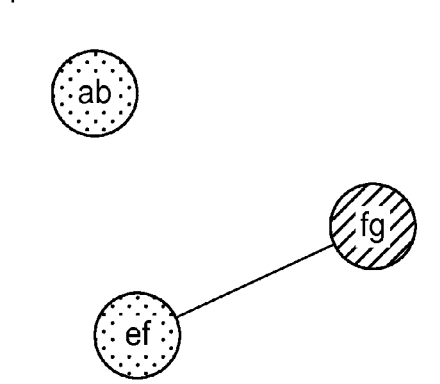
FIG. 5C
| VERTEX COLOR | RESOURCE NAME | RESOURCE SIZE |
|---|---|---|
| (dotted) | Res1 | Siz1 |
| (hatched) | Res2 | Siz1 |
FIG. 5D
| DATA FLOW | RESOURCE | ATTRIBUTE |
|---|---|---|
| | | DATA SIZE |
| ab | Res1 | Siz1 |
| bc | – | Siz2 |
| cd | – | Siz2 |
| be | – | Siz2 |
| df | – | Siz3 |
| ef | Res1 | Siz1 |
| fg | Res2 | Siz1 |

FIG. 6A
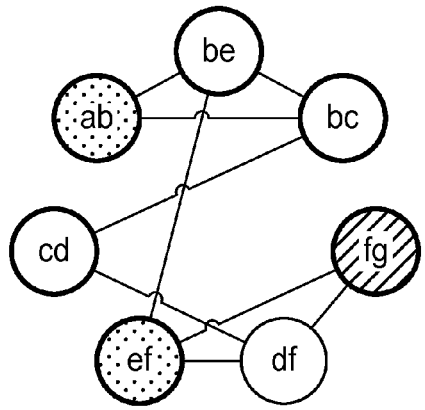
FIG. 6B
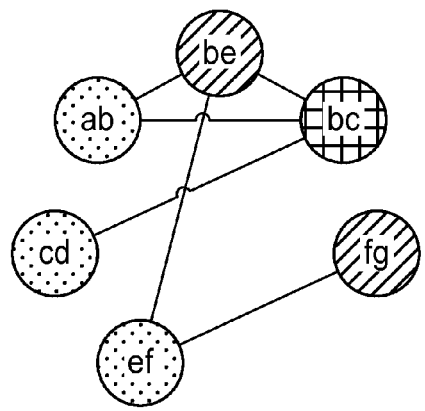
FIG. 6C
| VERTEX COLOR | RESOURCE NAME | RESOURCE SIZE |
|---|---|---|
| (dotted) | Res1 | Siz1 |
| (diagonal) | Res2 | Siz1 |
| (grid) | Res3 | Siz2 |
FIG. 6D
| DATA FLOW | RESOURCE | ATTRIBUTE |
| | | DATA SIZE |
|---|---|---|
| ab | Res1 | Siz1 |
| bc | Res3 | Siz2 |
| cd | Res1 | Siz2 |
| be | Res2 | Siz2 |
| df | – | Siz3 |
| ef | Res1 | Siz1 |
| fg | Res2 | Siz1 |

FIG. 7A
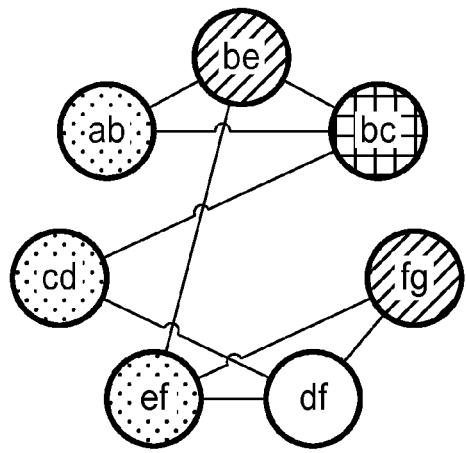
FIG. 7B
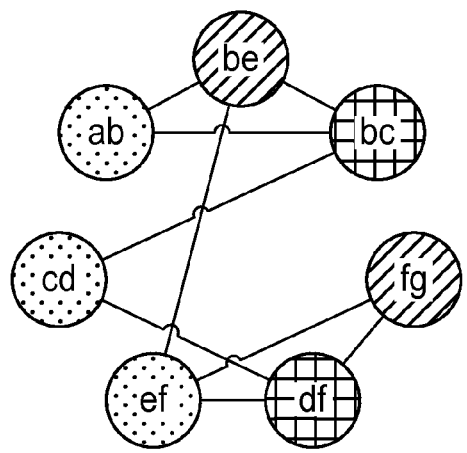
FIG. 7C
| VERTEX COLOR | RESOURCE NAME | RESOURCE SIZE |
|---|---|---|
| (dotted) | Res1 | Siz1 |
| (diagonal) | Res2 | Siz1 |
| (grid) | Res3 | Siz2 |
FIG. 7D
| DATA FLOW | RESOURCE | ATTRIBUTE |
| | | DATA SIZE |
|---|---|---|
| ab | Res1 | Siz1 |
| bc | Res3 | Siz2 |
| cd | Res1 | Siz2 |
| be | Res2 | Siz2 |
| df | Res3 | Siz3 |
| ef | Res1 | Siz1 |
| fg | Res2 | Siz1 |

| DATA FLOW | RESOURCE | ATTRIBUTES | |
| --- | --- | --- | --- |
| | | DATA SIZE | DATA SIZE |
| ab | - | Siz1 | RGB COLOR IMAGE |
| bc | - | Siz2 | GRAYSCALE IMAGE |
| cd | - | Siz2 | GRAYSCALE IMAGE |
| be | - | Siz2 | GRAYSCALE IMAGE |
| df | - | Siz3 | VERTEX COORDINATE PAIR |
| ef | - | Siz1 | RGB COLOR IMAGE |
| fg | - | Siz1 | RGB COLOR IMAGE |

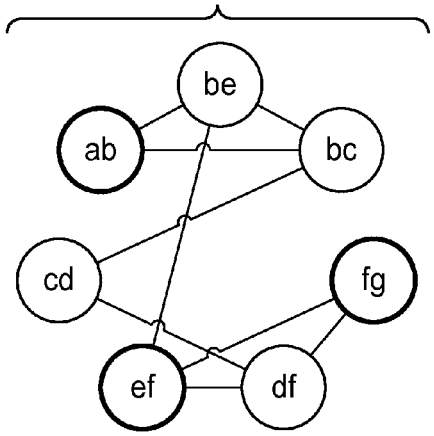
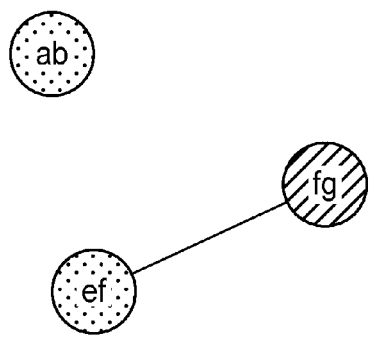

FIG. 12C

| VERTEX COLOR | | RESOURCE NAME | | RESOURCE SIZE |
|---|---|---|---|---|
| BASIC COLOR | BRANCH NUMBER | | BRANCH NUMBER | |
| (dotted) | | Res1 | | Siz1 |
| (dotted) | 1 | Res1 | 1 | Siz2 |
| (dotted) | 2 | Res1 | 2 | Siz2 |
| (dotted) | 3 | Res1 | 3 | Siz2 |
| (hatched) | | Res2 | | Siz1 |
| (hatched) | 1 | Res2 | 1 | Siz2 |
| (hatched) | 2 | Res2 | 2 | Siz2 |
| (hatched) | 3 | Res2 | 3 | Siz2 |

FIG. 12D

| DATA FLOW | RESOURCE | ATTRIBUTES | |
|---|---|---|---|
| | | DATA SIZE | DATA TYPE |
| ab | Res1 | Siz1 | RGB COLOR IMAGE |
| bc | – | Siz2 | GRAYSCALE IMAGE |
| cd | – | Siz2 | GRAYSCALE IMAGE |
| be | – | Siz2 | GRAYSCALE IMAGE |
| df | – | Siz3 | VERTEX COORDINATE PAIR |
| ef | Res1 | Siz1 | RGB COLOR IMAGE |
| fg | Res2 | Siz1 | RGB COLOR IMAGE |

FIG. 13A

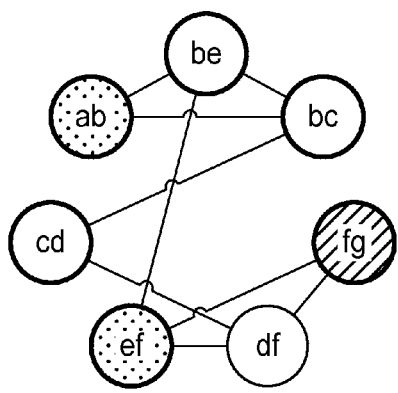

FIG. 13B

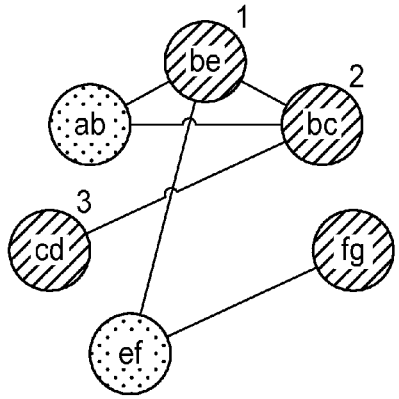

FIG. 13C

| VERTEX COLOR | | RESOURCE NAME | | RESOURCE SIZE |
|---|---|---|---|---|
| BASIC COLOR | BRANCH NUMBER | | BRANCH NUMBER | |
| (dotted) |  | Res1 |  | Siz1 |
| (dotted) | 1 | Res1 | 1 | Siz2 |
| (dotted) | 2 | Res1 | 2 | Siz2 |
| (dotted) | 3 | Res1 | 3 | Siz2 |
| (hatched) |  | Res2 |  | Siz1 |
| (hatched) | 1 | Res2 | 1 | Siz2 |
| (hatched) | 2 | Res2 | 2 | Siz2 |
| (hatched) | 3 | Res2 | 3 | Siz2 |

FIG. 13D

| DATA FLOW | RESOURCE | ATTRIBUTES | |
|---|---|---|---|
| | | DATA SIZE | DATA TYPE |
| ab | Res1 | Siz1 | RGB COLOR IMAGE |
| bc | Res2-2 | Siz2 | GRAYSCALE IMAGE |
| cd | Res2-3 | Siz2 | GRAYSCALE IMAGE |
| be | Res2-1 | Siz2 | GRAYSCALE IMAGE |
| df | – | Siz3 | VERTEX COORDINATE PAIR |
| ef | Res1 | Siz1 | RGB COLOR IMAGE |
| fg | Res2 | Siz1 | RGB COLOR IMAGE |

FIG. 14A

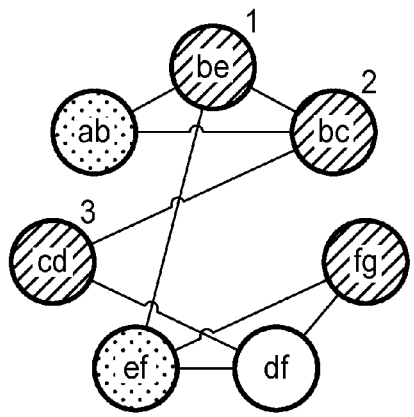

FIG. 14B

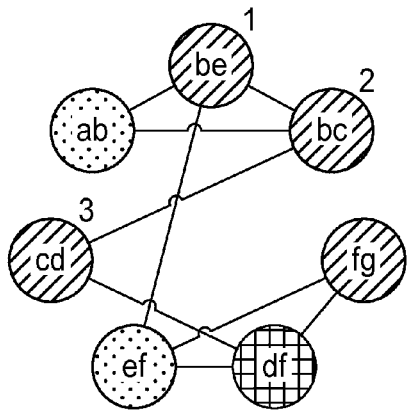

FIG. 14C

| VERTEX COLOR | | RESOURCE NAME | | RESOURCE SIZE |
|---|---|---|---|---|
| BASIC COLOR | BRANCH NUMBER | | BRANCH NUMBER | |
| (dotted) |  | Res1 |  | Siz1 |
|  | 1 | Res1 | 1 | Siz2 |
|  | 2 | Res1 | 2 | Siz2 |
|  | 3 | Res1 | 3 | Siz2 |
| (hatched) |  | Res2 |  | Siz1 |
|  | 1 | Res2 | 1 | Siz2 |
|  | 2 | Res2 | 2 | Siz2 |
|  | 3 | Res2 | 3 | Siz2 |
| (grid) |  | Res3 |  | Siz3 |

FIG. 14D

| DATA FLOW | RESOURCE | ATTRIBUTES | |
|---|---|---|---|
| | | DATA SIZE | DATA TYPE |
| ab | Res1 | Siz1 | RGB COLOR IMAGE |
| bc | Res2-2 | Siz2 | GRAYSCALE IMAGE |
| cd | Res2-3 | Siz2 | GRAYSCALE IMAGE |
| be | Res2-1 | Siz2 | GRAYSCALE IMAGE |
| df | Res3 | Siz3 | VERTEX COORDINATE PAIR |
| ef | Res1 | Siz1 | RGB COLOR IMAGE |
| fg | Res2 | Siz1 | RGB COLOR IMAGE |

| DATA FLOW | RESOURCE | ATTRIBUTES | |
|---|---|---|---|
| | | NUMBER OF SIMPLE TYPES | DATA TYPE |
| ab | – | 3 | RGB COLOR IMAGE |
| bc | – | 1 | GRAYSCALE IMAGE |
| cd | – | 1 | GRAYSCALE IMAGE |
| be | – | 1 | GRAYSCALE IMAGE |
| df | – | 1 | VERTEX COORDINATE PAIR |
| ef | – | 3 | RGB COLOR IMAGE |
| fg | – | 3 | RGB COLOR IMAGE |

F I G. 18A

| VERTEX COLOR | | RESOURCE NAME | | RESOURCE SIZE |
|---|---|---|---|---|
| BASIC COLOR | BRANCH NUMBER | | BRANCH NUMBER | |
| (dotted) |  | Res1 |  | 3×SizBU |
| | 1 | | 1 | SizBU |
| | 2 | | 2 | SizBU |
| | 3 | | 3 | SizBU |
| (diagonal) |  | Res2 |  | 3×SizBU |
| | 1 | | 1 | SizBU |
| | 2 | | 2 | SizBU |
| | 3 | | 3 | SizBU |
| (grid) |  | Res3 | | SizBU |

F I G. 18B

| DATA FLOW | RESOURCE | ATTRIBUTES | |
|---|---|---|---|
| | | NUMBER OF SIMPLE TYPES | DATA TYPE |
| ab | Res1 | 3 | RGB COLOR IMAGE |
| bc | Res2-2 | 1 | GRAYSCALE IMAGE |
| cd | Res2-3 | 1 | GRAYSCALE IMAGE |
| be | Res2-1 | 1 | GRAYSCALE IMAGE |
| df | Res3 | 1 | VERTEX COORDINATE PAIR |
| ef | Res1 | 3 | RGB COLOR IMAGE |
| fg | Res2 | 3 | RGB COLOR IMAGE | ns
STORAGE RESOURCE ALLOCATION TO DATAFLOWS BASED ON DATA REQUIREMENTS AND ATTRIBUTES

BACKGROUND OF THE INVENTION

Field of the Invention

The present invention relates to the allocation of data storage resources to data flows.

Description of the Related Art

There is a concept called a data flow focusing attention on the flow of data as a method of modeling (expressing) various algorithms (systems). The flow of data in an algorithm is called a data flow, and an operation of receiving data from a data flow, performing processing on the received data, and outputting the result of the processing to a data flow is called a process. The process performs processing when receiving data from a data flow on the input side, and outputs the result of the processing to a data flow on the output side. Processing advances while data is converted by processes along data flows. The data flow having this mechanism is often used in data driven type algorithm development.

There is a diagram called a data flow diagram (DFD) graphically describing data flows. An example is a data flow diagram as shown in FIG. 1A. Referring to FIG. 1A, external entity A (1001) is a camera, and a sensed image is input to process B (1002) along data flow ab (1101). Processes B (1002) to F (1006) sequentially perform processing along data flows, and finally output the processing result to external entity G (1007) which is a display. Each of external entities A (1001) and G (1007) exists outside a system to be modeled, and functions as a data input source or data output destination of the system.

When implementing an algorithm described by a DFD as computer software, each process is generated as an instance (object), and the generated processes are associated with each other by an object representing a data flow.

Data flowing through data flows are exchanged between processes via a data storage resource such as a memory or file associated with each data flow. That is, the process reads out input data from a data storage resource associated with an input-side data flow, and writes the processing result in a data storage resource associated with an output-side data flow.

As data processing techniques using a data flow, Cantata (see A Hands-on Guide to VisiQuest, AccuSoft Corporation) and DirectShow (see DirectX 9.0 Programmer's Reference, Microsoft Corporation) are known.

In Cantata, files are used as data storage resources, and an individual file is allocated to each data flow.

In DirectShow, no static data storage resource is associated with any data flow, and an allocator is associated with each data flow instead. A process issues a data storage resource acquisition request to an allocator when necessary (when outputting data), sets a value in the data storage resource, and transfers the data storage resource to a process as the destination of the data flow. When the processing is complete, if the process determines that the data storage resource is unnecessary, the process requests the allocator to collect the data storage resource. If the input and output allocators are the same, the process can transfer a data storage resource obtained from the input side directly to a process on the output stage, without acquiring any new data storage resource for output.

In Cantata, however, files equal in number to data flows exist. Therefore, many data storage resources unrelated to a process currently executing processing exist, so a file storage amount in a disk or the like is enormous. To increase the processing speed, therefore, it is possible to, for example, expand data storage resources on a memory. In this case, however, the memory amount required for the system becomes enormous.

In DirectShow, data storage resources are dynamically acquired and collected. This promotes the reuse of the data storage resources (that is, a plurality of data flows share the same data storage resource). This reduces the memory amount required for the programs. Since, however, data storage resource acquisition and collection requests are frequently performed for allocators, the calling cost and request processing cost are high. Generally, these calling and requesting processes interrupt the pipeline of a CPU, thereby causing a large decrease in processing speed in a system that processes a large amount of data.

SUMMARY OF THE INVENTION

Some embodiments of the present invention can efficiently allocate data storage resources to a plurality of data flows.

According to one embodiment, a resource allocation apparatus comprises: an attribute acquisition unit configured to acquire an attribute indicating a requirement for a data storage resource to be allocated to a plurality of data flows to which the attribute is provided beforehand; a graph generation unit configured to generate a data flow relationship graph indicating a relationship between the plurality of data flows which potentially lead to access contention in the data storage resource; and an allocation determination unit configured to determine, based on the attribute and the data flow relationship graph, allocation of the data storage resource to the plurality of data flows such that no access contention occurs.

According to another embodiment, a resource allocation method comprises: acquiring an attribute indicating a requirement for a data storage resource to be allocated to a plurality of data flows to which the attribute is provided beforehand; generating a data flow relationship graph indicating a relationship between the plurality of data flows which potentially lead to access contention in the data storage resource; and determining, based on the attribute and the data flow relationship graph, allocation of the data storage resource to the plurality of data flows such that no access contention occurs.

According to still another embodiment, a non-transitory computer-readable storage medium stores a program which instructs a computer to: acquire an attribute indicating a requirement for a data storage resource to be allocated to a plurality of data flows to which the attribute is provided beforehand; generate a data flow relationship graph indicating a relationship between the plurality of data flows which potentially lead to access contention in the data storage resource; and determine, based on the attribute and the data flow relationship graph, allocation of the data storage resource to the plurality of data flows such that no access contention occurs.

Further features of the present invention will become apparent from the following description of exemplary embodiments (with reference to the attached drawings).

BRIEF DESCRIPTION OF THE DRAWINGS

FIGS. 5A to 5D are views showing the resource setting state in the middle stage of the first embodiment;

FIGS. 6A to 6D are views showing the resource setting state in the middle stage of the first embodiment;

FIGS. 7A to 7D are views showing the resource setting state in the final stage of the first embodiment;

FIGS. 12A to 12D are views showing the resource setting state in the middle stage of the second embodiment;

FIGS. 13A to 13D are views showing the resource setting state in the middle stage of the second embodiment;

FIGS. 14A to 14D are views showing the resource setting state in the final stage of the second embodiment.

FIGS. 18A and 18B are views showing the resource setting state in the final stage of the fourth embodiment.

DESCRIPTION OF THE EMBODIMENTS

Embodiments of the present invention will be explained below with reference to the accompanying drawings. Note that the following embodiments do not limit the present invention related to the scope of claims, and not all combinations of features explained in the embodiments are essential for the present invention.

First Embodiment

Figure 1A:
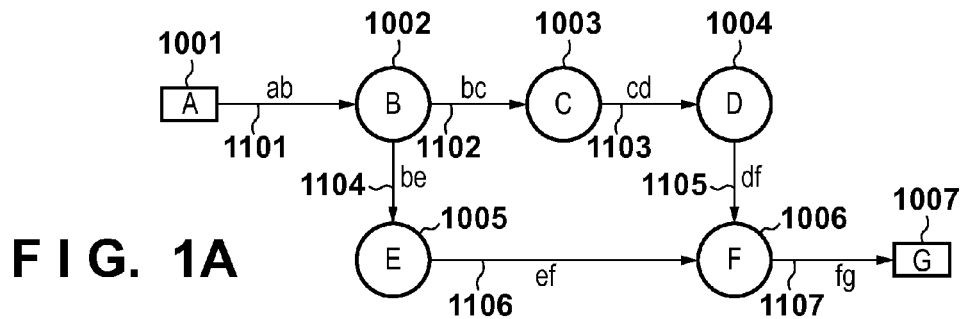
FIGS. 1A to 1D show a general data flow diagram, and examples of the allocation of a resource to each data flow.

First, a data flow diagram shown in FIG. 1A will be explained. Referring to FIG. 1A, data output from external entity A (1001) reaches process B (1002) through data flow ab (1101). Process B (1002) performs processing based on the data, and outputs two kinds of data to data flow be (1102) and data flow be (1104). The system executes processing as indicated by the data flow diagram. This will be expressed as "execute a data flow diagram" hereinafter.

The allocation of data storage resources when executing the data flow diagram shown in FIG. 1A will be explained below by comparing an art known to the inventors with this embodiment. Note that data storage resources will simply be referred to as resources hereinafter.

Execution of Data Flow Diagram (Art Known to the Inventors)

Figure 1B:
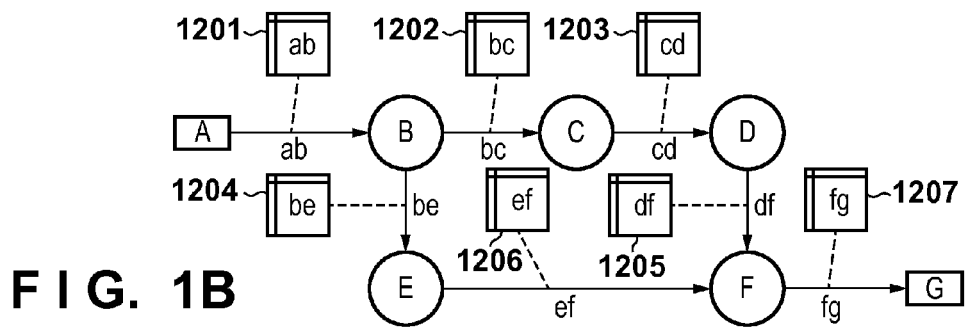

When the data flow diagram shown in FIG. 1A is executed in an art known to the inventors, resource allocation is as shown in FIG. 1B. Referring to FIG. 1B, resources (1201 to 1207) are allocated to data flows before the execution of the data flow diagram. The entity of each resource is, for example, a memory block secured on a memory, or a file formed on a disk. Processes exchange data by reading and writing the data with respect to these resources. Note that one resource is associated with each data flow, but each individual resource may also be associated with a plurality of data flows. By associating one resource with many data flows, it is possible to reduce the memory amount required for the system and the file storage amount of a disk or the like. Note that the explanation will be made by assuming that the entity of each resource is a memory, but the present invention does not limit the entity of a resource to the memory.

Process B (1002) reads data from resource ab (1201), and writes the data in resources be (1202) and be (1204). If the entities of resources ab (1201) and bc (1202) are the same, access contention occurs between read and write, so no correct processing result is guaranteed. This similarly applies to other resource combinations. Accordingly, independent resources must be allocated to these three data flows (ab (1201), bc (1202), and be (1204)) pertaining to the processing by process B (1002). This similarly applies to other processes.

Figure 1C:
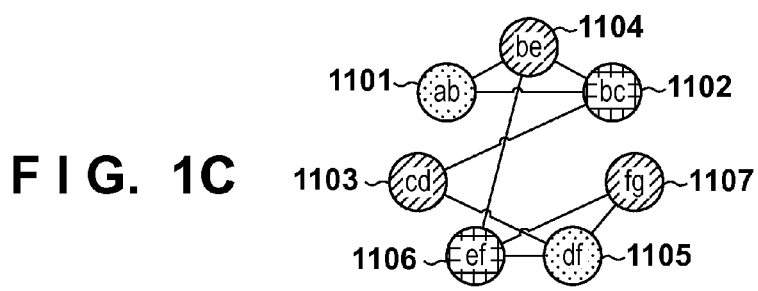
Figure 1D:
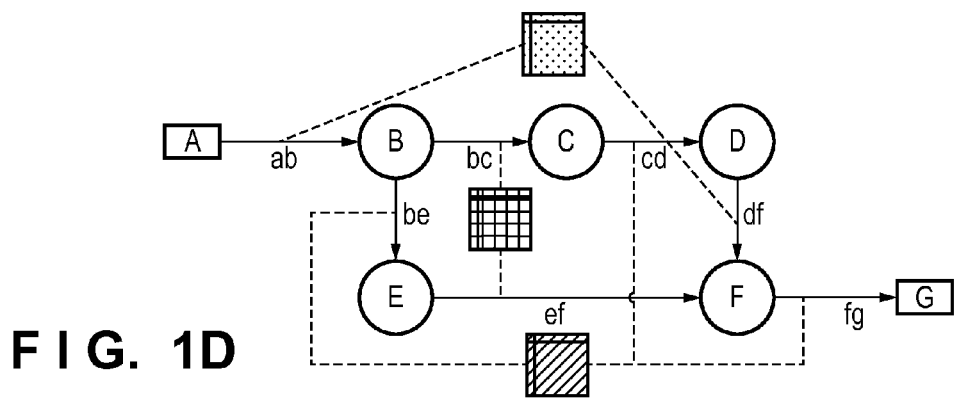

FIG. 1C shows a graph representing an access contention relationship between resources to be allocated to data flows. Referring to FIG. 1C, vertices represent data flows, and edges connecting the vertices represent the access contention relationship. Since data flows at the two ends of each edge cause access contention, independent resources must be allocated to these data flows. Resources allocatable without causing any access contention are equivalent to "colors" when vertices at the two ends of each edge are colored in different colors in FIG. 1C. That is, fewest resources can be allocated by coloring vertices in fewest colors. This problem is known as the vertex coloring problem (NP-hard), so an explanation of a practical coloring procedure will be omitted. Note that in FIG. 1C, the "color" of each vertex is expressed by a fill pattern. According to these fill patterns, the data flow diagram shown in FIG. 1A can be executed by securing three resources and allocating them to the individual data flows. FIG. 1D shows the allocation result. Referring to FIG. 1D, a first resource is allocated to data flows ab and df, a second resource is allocated to data flows be and ef, and a third resource is allocated to data flows be, cd, and fg.

The foregoing is the resource allocation method using the art known to the inventors. By contrast, in resource allocation method according to this embodiment, attributes are given to data flows, and resources are allocated based on the attributes.

Execution of Data Flow Diagram (this Embodiment)

In this embodiment, data storage resources are allocated to data flows to each of which a size attribute indicating the size of a necessary data storage resource is given, so as not to cause any access contention. More specifically, the size attributes are acquired from a plurality of data flows, and a data flow relationship graph indicating a relationship in which access contention occurs for a data storage resource between the plurality of data flows is generated. Based on the obtained size attributes and data flow relationship graph, the allocation of data storage resources to the plurality of data flows is determined.

Figure 2A:
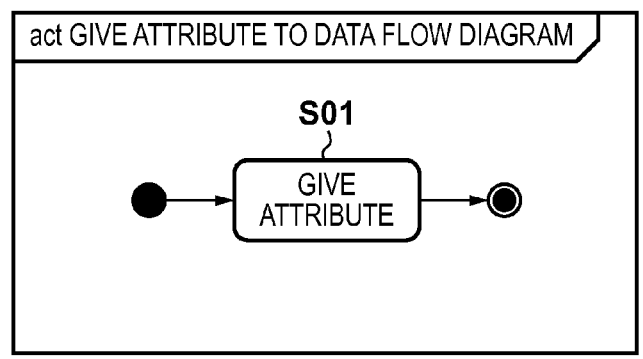
FIGS. 2A to 2C are views showing an operation of allocating resources to a data flow diagram according to the first embodiment.

The data resource allocation method according to the present invention will be explained below with reference to FIGS. 2A to 2C. FIG. 2A shows a procedure of giving attributes to a data flow diagram. In this embodiment, attributes are given to data flows in attribute giving step S01, before the execution of the data flow diagram. An attribute is given to each data flow via, for example, a GUI supporting the formation of the data flow diagram. FIG. 3 shows an example in which data sizes are given as attributes to the data flow diagram shown in FIG. 1A. Referring to FIG. 3, data having a large size (Siz1) flows through data flows ab (1101), of (1106), and fg (1107). Likewise, data having a medium size (Siz2) flows through data flows be (1102), cd (1103), and be (1104), and data having a small size (Siz3) flows through data flow df (1105). In this example, Siz1, Siz2, or Siz3 is given as a data size attribute value to each data flow.

The data resource allocation method according to this embodiment statically allocates resources to data flows based on the data flow diagram (FIG. 3) given the attribute values. This procedure will be explained with reference to FIG. 2B.

Figures 4A, 4B:
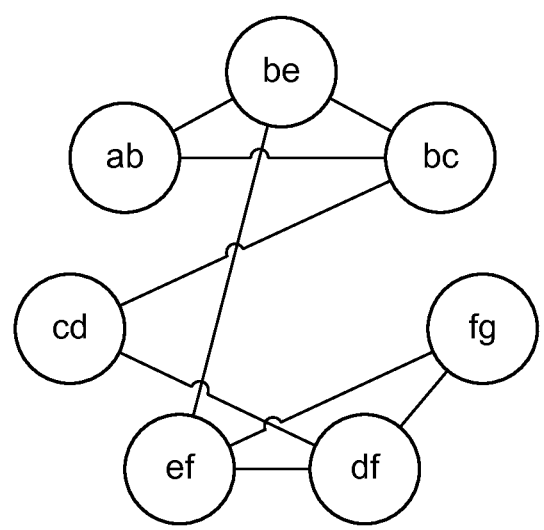
FIGS. 4A and 4B are views showing the resource setting state in the initial stage of the first embodiment.

First, in attribute read step S11, an attribute (data size) given to each data flow is read out. The readout results are held on the system so that the system can easily process the results. For example, as shown in FIG. 4A, the attribute readout results are formed as a data flow attribute table on a memory (not shown). Note that this data flow attribute table indicates the resource setting result of each data flow in the "resource" column of the table, but this column is blank in the initial state because actual allocation is performed later.

Simultaneously, in data flow relationship read step S12, the relationship between data flows not to be accessed at the same time because access contention occurs is extracted. In this step, the relationship between data flows as an input and output of the same process is extracted as a data flow relationship in which access contention occurs. This extraction result is held on the system so that the system can easily process the result. For example, as shown in FIG. 4B, the extraction result of a data flow relationship in which access contention occurs is formed on a memory (not shown) as a vertex coloring problem type data flow relationship graph having each data flow as a vertex.

Then, in allocation resource determination step S13, resources to be allocated to the data flows are determined based on the data flow attribute table and data flow relationship graph formed in steps S11 and S12. Details of allocation resource determination step S13 will be explained below with reference to FIG. 2C.

First, in unallocated data flow marking step S131, data flows (vertices) to be allocated are marked in the data flow relationship graph. As a data flow to be marked, a data flow whose data size attribute indicates a maximum size is selected from data flows to which no resources are allocated, by referring to the data flow attribute table. Since no vertex is marked in the initial state, a data flow having a largest data size attribute (in this case, Siz1) is marked. FIG. 5A shows the marking result in this initial state (marked vertices are expressed by thick contours). Referring to FIG. 5A, data flows ab, ef, and fg are marked.

Then, in resource determination step S132, uncolored marked vertices in the data flow relationship graph are colored by solving the vertex coloring problem. FIG. 5B shows the coloring result (vertex colors). FIG. 5B is a partial graph showing the vertices marked in FIG. 5A and an edge having these vertices as two ends. When performing coloring in step S132, information of a resource corresponding to each newly used vertex color is added to the resource table. FIG. 5C shows an example of this resource table. Referring to FIG. 5C, resource information of the vertex color (indicated by halftone dots in FIG. 5C) of newly marked data flows ab and ef and the vertex color (indicated by oblique lines in FIG. 5C) of newly marked data flow fg is added to (formed in) the resource table. The size (resource size) of resources (Res1 and Res2) added to the resource table is Siz1. When the resources are thus allocated to data flows ab, ef, and fg in step S132, the data flow attribute table in the initial state shown in FIG. 4A is updated as shown in FIG. 5D.

In step S133, whether an unallocated data flow exists is checked. Since the "resource" column has blanks in the data flow attribute table shown in FIG. 5D, it is determined that unallocated data flows exist, so the process returns to unallocated data flow marking step S131 and continues.

In step S131, data flows having a largest data size attribute (in this case, Siz2) are marked from the unallocated data flows. FIG. 6A shows the result. Referring to FIG. 6A, data flows be, bc, and cd are marked.

In step S132, uncolored vertices of the marked vertices are colored by solving the vertex coloring problem. In this step, the color of an already colored vertex is not changed. As the processing results of this coloring, FIG. 6B shows the coloring result, FIG. 6C shows the updated resource table, and FIG. 6D shows the updated data flow attribute table. The size (resource size) of a resource (Res3) newly added to the resource table shown in FIG. 6C is Siz2.

In step S133, whether an unallocated data flow exists is checked. Since the "resource" column has a blank in the data flow attribute table shown in FIG. 6D, it is determined that an unallocated data flow exists, so the process returns to step S131 and continues.

In step S131, a data flow having a largest data size attribute (the data size is Siz3) is marked from the unallocated data flows. FIG. 7A shows the result. Referring to FIG. 7A, data flow df is marked.

In step S132, if the marked vertex is an uncolored vertex, the vertex is colored by solving the vertex coloring problem. In this step, the color of an already colored vertex is not changed. As the processing results of this coloring, FIG. 7B shows the coloring result, FIG. 7C shows the updated resource table, and FIG. 7D shows the updated data flow attribute table. According to the coloring result shown in FIG. 7B, newly marked data flow df has the same color as that of data flow bc. Accordingly, no access contention occurs between data flows df and bc, so the same resource can be allocated. Therefore, no new resource having resource size Siz3 is added to the resource table shown in FIG. 7C. In the data flow attribute table shown in FIG. 7D, the data size attribute of data flow df is Siz3, but Res3 having resource size Siz2 is allocated as a resource. That is, the same resource Res3 as that of data flow bc is allocated to data flow df.

In step S133, whether an unallocated data flow exists is checked. Since the "resource" column has no blank in the data flow attribute table shown in FIG. 7D, it is determined that no unallocated data flow exists. Accordingly, the processing of allocation resource determination step S13 is terminated.

Figure 8:
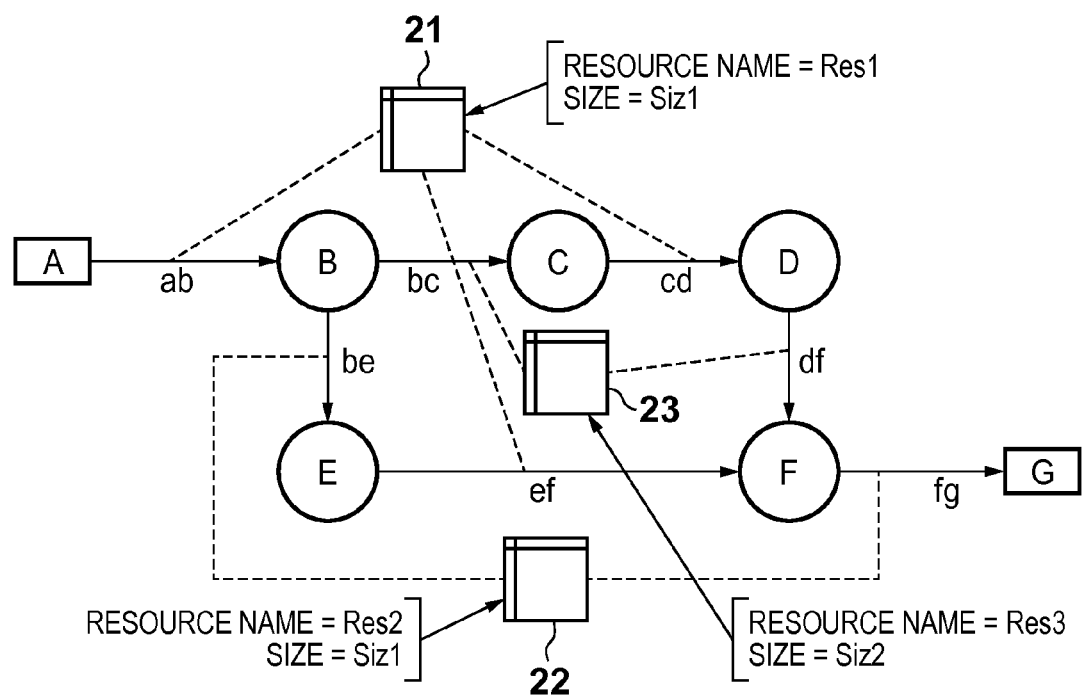
FIG. 8 is a view showing the resource allocation result according to the first embodiment.

Referring back to FIG. 2B, in resource allocation step S14, three resources (Res1, Res2, and Res3) are secured based on the resource table (FIG. 7C). Then, the resources are allocated to data flows based on the data flow attribute table (FIG. 7D). FIG. 8 shows the allocation result. Referring to FIG. 8, two resources 21 and 22 (Res1 and Res2) having size Siz1 and a resource 23 (Res3) having size Siz2 are allocated to data flows. That is, the total size of the resources allocated to the data flow diagram is Siz1×2+Siz2.

The comparison of this allocation result with the allocation result of the art known to the inventors is as follows. The allocation result of the art known to the inventors is as shown in FIG. 1D, that is, three resources are allocated. The sizes of these resources are not particularly limited. For example, Siz1 assumed as the largest data flow in this system is set as the size. Therefore, the total size of the resources allocated in the art known to the inventors is Siz1×3. That is, this embodiment can allocate resources such that the total size of the resources is smaller than that in the art known to the inventors. The difference between the resource size totals directly appears as the difference between memory amounts required for the system, or the difference between file storage amounts such as disks.

Apparatus Arrangement

Figure 9:
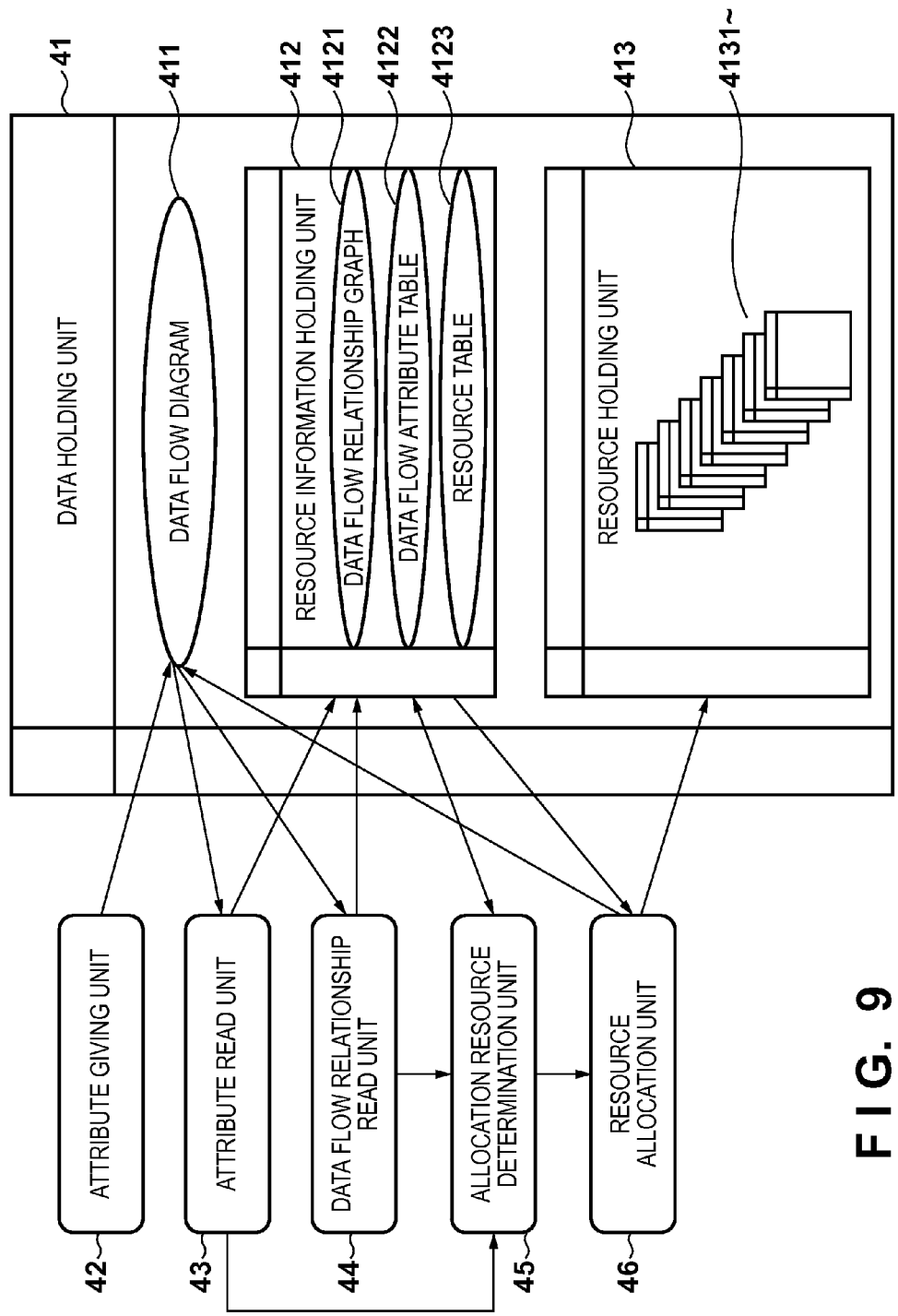
FIG. 9 is a view showing a functional arrangement example when the present invention is implemented in an information processing apparatus.

FIG. 9 shows a functional arrangement example when the data flow resource allocation method according to this embodiment is implemented in an information processing apparatus. This functional arrangement is implemented by, for example, a CPU of the information processing apparatus by executing a control program expanded on a ROM or RAM.

Referring to FIG. 9, a data holding unit 41 is implemented by a RAM, hard disk, or the like, and holds various kinds of data. More specifically, the data holding unit 41 holds a data flow diagram 411 as an execution target. A resource information holding unit 412 holds various kinds of data (a data flow relationship graph 4121, data flow attribute table 4122, and resource table 4123) for allocating resources. A resource holding unit 413 holds resources 4131, . . . , to be allocated to data flows.

The information processing apparatus further comprises an attribute giving unit 42, attribute read unit 43, data flow relationship read unit 44, allocation resource determination unit 45, and resource allocation unit 46 as a functional arrangement. The attribute giving unit 42 executes attribute giving step S01 shown in FIG. 2A. The attribute read unit 43 executes attribute read step S11 shown in FIG. 2B. The data flow relationship read unit 44 executes data flow relationship read step S12. The allocation resource determination unit 45 executes allocation resource determination step S13. The resource allocation unit 46 executes resource allocation step S14.

In this embodiment as explained above, efficient allocation is performed by taking account of the size of a resource required by a data flow so that no access contention occurs. When compared to the art known to the inventors, therefore, the file storage amount can be reduced as a whole.

Note that in this embodiment, the size of a resource to be newly allocated is explained as a data size given to a data flow. However, this data size is a minimum value, so the resource size need only be at least equal to or larger than this data size. For example, the resource size can be rounded to be larger than the data size given to a data flow, for each cache line size.

Also, in this embodiment, resources are determined by sequentially marking only data flows (vertices) given the same data size attribute value. However, it is also possible to collectively mark data flows having data sizes falling within a predetermined range. In this case, the size of a resource to be newly allocated need only be at least the largest value of the data size attributes of data flows to be added.

Second Embodiment

The second embodiment according to the present invention will be explained below. The above-described first embodiment is an example in which a data size attribute is given to a data flow. The second embodiment is an example in which a data type attribute is further given. The data type is roughly classified into a simple type and complex type. The complex type includes a plurality of simple types or complex types, that is, the complex type has a structure that can be divided into a plurality of simple types or complex types. By contrast, the simple type does not include any other data type, and cannot be divided any further. For example, a data type "RGB color image" includes "grayscale images" of R, G, and B. Accordingly, the data type "RGB color image" is a complex type including three "grayscale image" data types. In this case, "grayscale image" is a simple type that cannot be divided any further. Since "RGB color image" thus includes three "grayscale images", a resource allocated to one "RGB color image" can be used as a resource of three "grayscale images".

Figure 10:
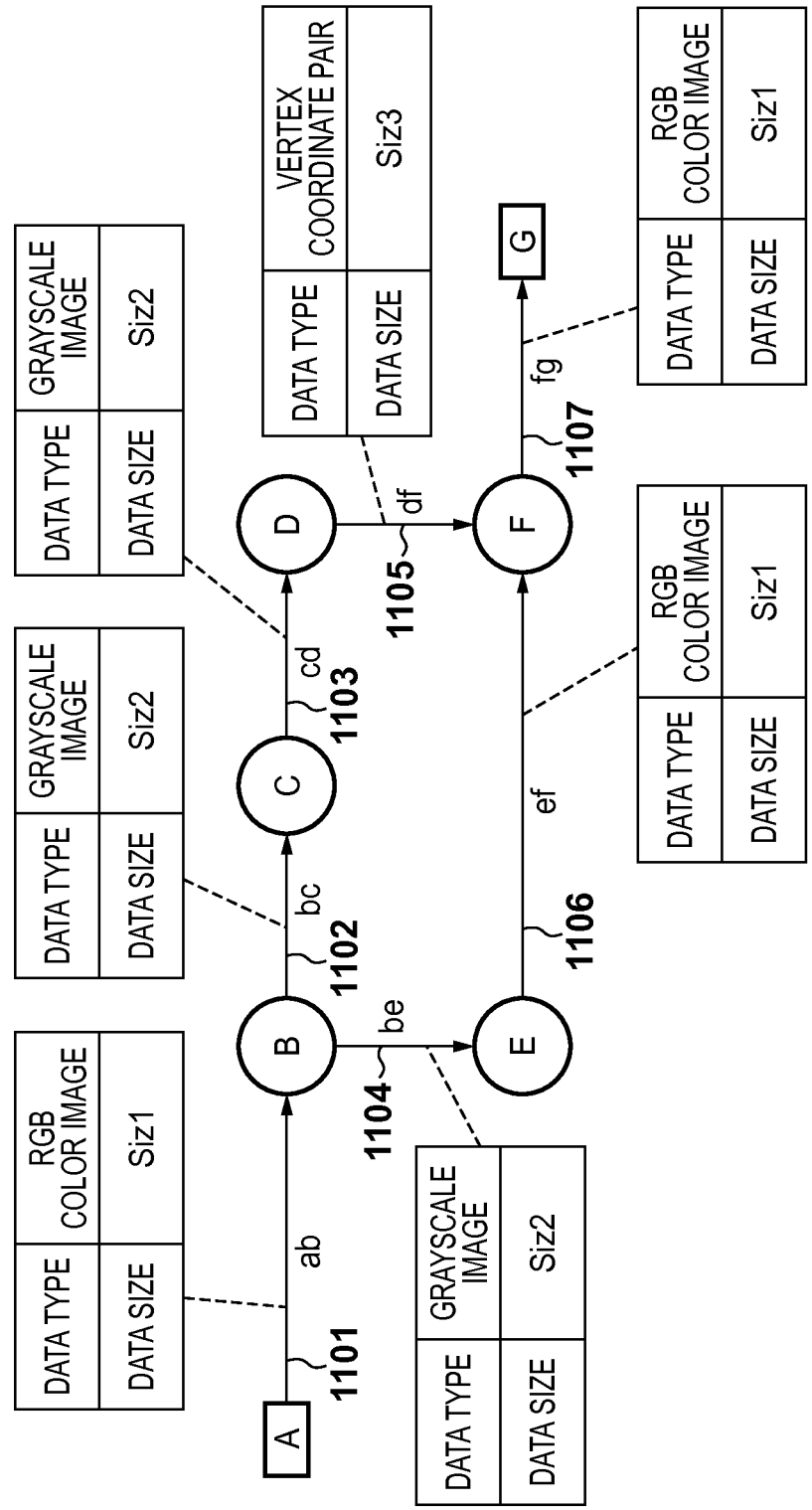
FIG. 10 is a data flow diagram given data type attributes according to the second embodiment.

The procedure of a resource allocation method according to the second embodiment will be explained below by taking, as an example, a case in which "RGB color image" and "grayscale image" are used as two kinds of data type attributes. The data resource allocation method according to the second embodiment is almost the same as that of the above-described first embodiment. That is, as shown in FIG. 2A, attributes are given to a data flow diagram in step S01. FIG. 10 shows an example in which data type attributes are given to the data flow diagram shown in FIG. 1A. Referring to FIG. 10, RGB color image data flows through data flows ab (1101), of (1106), and fg (1107). Similarly, grayscale image data flows through data flows be (1102), cd (1103), and be (1104), and data of the diagonal vertex coordinates of a rectangle flows through data flow df (1105). In this state, the value of "RGB color image", "grayscale image", or "vertex coordinate pair" is given as a data type attribute to each data flow. A data size attribute is also given to each data flow as in the first embodiment.

In the data resource allocation method according to the second embodiment, a resource is allocated to each data flow based on the data flow diagram (FIG. 10) to which the attribute values are given. This procedure is also the same as that of the first embodiment as shown in FIG. 2B.

Figures 11A, 11B:
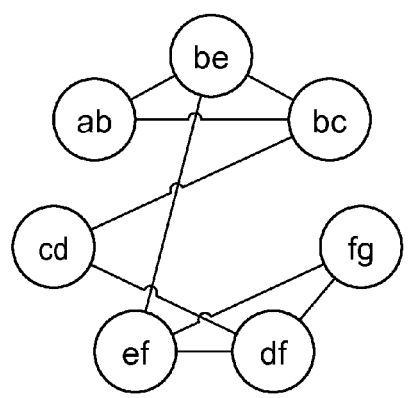
FIGS. 11A and 11B are views showing the resource setting state in the initial stage of the second embodiment.

First, in attribute read step S11, the attributes (the data size and data type) given to each data flow are read out. As shown in FIG. 11A, for example, the readout results are formed as a data flow attribute table on a memory (not shown).

Simultaneously, in data flow relationship read step S12, the relationship between data flows as an input and output of the same process is extracted as a data flow relationship in which access contention occurs, in the same manner as in the first embodiment. As shown in FIG. 11B, the extraction result is formed as a vertex coloring problem type data flow relationship graph on a memory (not shown).

Then, in allocation resource determination step S13, resources to be allocated to the data flows are determined based on the data flow attribute table and data flow relationship graph formed in steps S11 and S12. Details of allocation resource determination step S13 in the second embodiment are the same as in the first embodiment as shown in FIG. 2C, except that the operation in resource determination step S132 is different from the first embodiment. The details of allocation resource determination step S13 in the second embodiment will be explained below with reference to FIG. 2C.

First, in unallocated data flow marking step S131, data flows (vertices) to be allocated are marked in the data flow relationship graph. For example, a data flow to which no resource is allocated and which has a maximum data size attribute (Siz1) is marked by referring to the data flow attribute table. As in the first embodiment, the marking result in the initial state is as shown in FIG. 12A. Referring to FIG. 12A, data flows ab, ef, and fg are marked.

Then, in resource determination step S132, uncolored marked vertices in the data flow relationship graph are colored by solving the vertex coloring problem. FIG. 12B shows the coloring result (vertex colors) in the second embodiment. When performing this coloring, information of a resource corresponding to a newly used vertex color is formed as a resource table in the second embodiment as well. FIG. 12C shows an example of the formed resource table. The size (resource size) of resources (Res1 and Res2) added to the resource table is Siz1.

The resource table in the second embodiment will be explained in detail below. The data type attribute of data flows ab, ef, and fg to which the resources (Res1 and Res2) correspond, as shown in FIG. 12C, is "RGB color image". That is, since these resources (Res1 and Res2) correspond to a complex type data flow, each resource can be divided and the divisions can be allocated to respective three "grayscale images". In the second embodiment, therefore, in the resource table shown in FIG. 12C, divided area items are formed by dividing each of these resources (Res1 and Res2) into three parts, and a branch number is given to each divided area. For example, divided areas Res1-1, Res1-2, and Res1-3 are formed as items of resource Res1, and a resource size (Siz2=Siz1×⅓) corresponding to "grayscale image" is described in each divided area. In addition, a branch number corresponding to the vertex color is set for each divided area. That is, "basic color" is set as each vertex color and kept set for a resource having no branch number, and "basic color+branch number" is set for a resource having a branch number.

When the allocation of resources to data flows ab, ef, and fg is thus determined in step S132, the data flow attribute table in the initial state shown in FIG. 11A is updated as shown in FIG. 12D.

In step S133, whether an unallocated data flow exists is checked. Since the "resource" column has blanks in the data flow attribute table shown in FIG. 12D, it is determined that unallocated data flows exist, so the process returns to unallocated data flow marking step S131 and continues.

In step S131, data flows having a largest data size attribute (the data size is Siz2) are marked from the unallocated data flows. FIG. 13A shows the result. Referring to FIG. 13A, data flows be, bc, and cd are marked.

In step S132, uncolored vertices of the marked vertices are colored by solving the vertex coloring problem. In the second embodiment, it can be defined that the colors of vertices at the two ends of an edge are different when combinations of "basic color+branch number", or "basic colors" if at least one vertex has no branch number, are different. Note that the color of an already colored vertex is not changed as in the first embodiment. FIG. 13B shows the coloring result in which a branch number is shown beside each vertex. Referring to FIG. 13B, newly marked data flows be, bc, and cd have the same basic color as that of data flow fg. Accordingly, no access contention occurs between data flow fg and each of data flows be, bc, and cd, so the same resource as that of data flow fg can be allocated to these data flows. In the second embodiment, therefore, divided areas Res2-1, Res2-2, and Res2-3 of resource Res2 allocated to data flow fg are respectively allocated to data flows be, bc, and cd.

FIG. 13C shows the updated resource table, and FIG. 13D shows the updated data flow attribute table. No new resource having resource size Siz2 is added to the resource table shown in FIG. 13C, that is, coloring is complete without securing any new resource. In the data flow attribute table shown in FIG. 13D, resources Res2-1, Res2-2, and Res2-3 are respectively allocated to data flows be, bc, and cd. Note that resources Res2-1, Res2-2, and Res2-3 need only be allocated in one-to-one correspondence with data flows be, bc, and cd.

In step S133, whether an unallocated data flow exists is checked. Since the "resource" column has a blank in the data flow attribute table shown in FIG. 13D, it is determined that an unallocated data flow exists, so the process returns to step S131 and continues.

In step S131, a data flow having a largest data size attribute (the data size is Siz3) is marked from unallocated data flows. FIG. 14A shows the result. Referring to FIG. 14A, data flow df is marked.

In step S132, if the marked vertex is an uncolored vertex, the vertex is colored by solving the vertex coloring problem. In this step, the color of an already colored vertex is not changed. As the processing results of this coloring, FIG. 14B shows the coloring result, FIG. 14C shows the updated resource table, and FIG. 14D shows the updated data flow attribute table. According to the coloring result shown in FIG. 14B, a new vertex color is set for newly marked data flow df. Accordingly, a new resource (Res3) having resource size Siz3 is added to the resource table shown in FIG. 14C, and resource Res3 is allocated to data flow df in the data flow attribute table shown in FIG. 14D.

In step S133, whether an unallocated data flow exists is checked. Since the "resource" column has no blank in the data flow attribute table shown in FIG. 14D, it is determined that no unallocated data flow exists. Accordingly, the processing of allocation resource determination step S13 is terminated.

Figure 15:
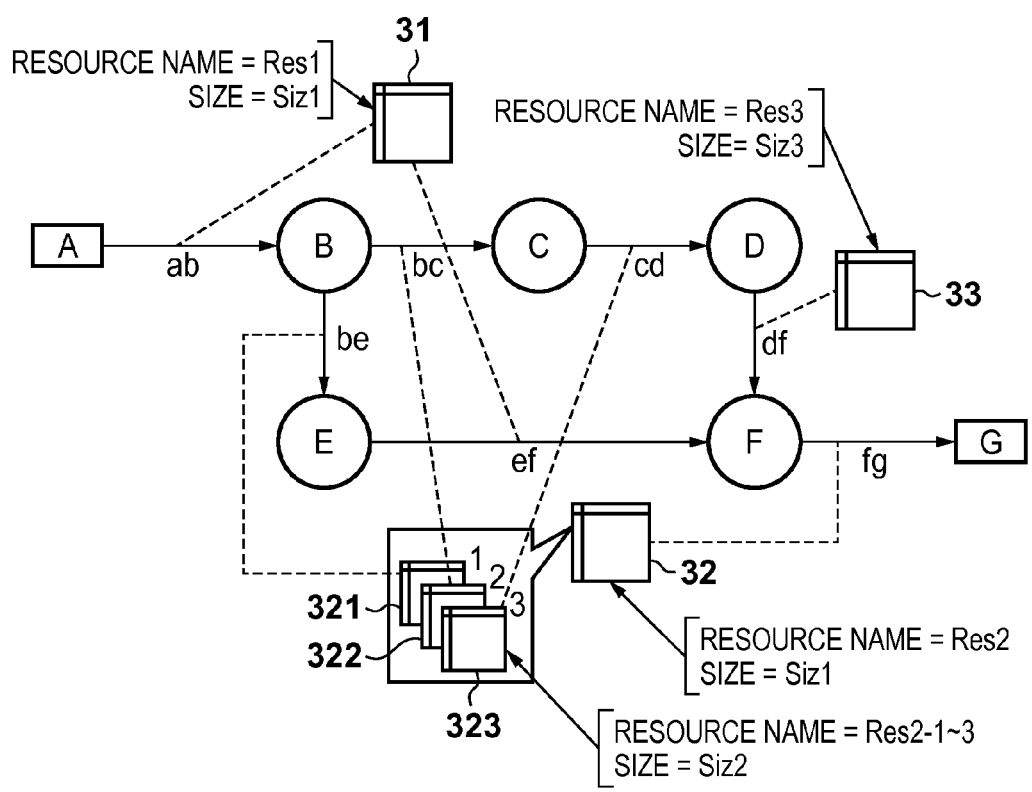
FIG. 15 is a view showing the resource allocation result according to the second embodiment.

Referring back to FIG. 2B, in resource allocation step S14, three resources (Res1, Res2, and Res3) are secured based on the resource table (FIG. 14C). Then, the resources are allocated to data flows based on the data flow attribute table (FIG. 14D). FIG. 15 shows the way the resources are allocated. Referring to FIG. 15, two resources 31 and 32 (Res1 and Res2) having size Siz1 and a resource 33 (Res3) having size Siz3 are allocated to data flows. Also, the resource 32 (Res2) is further divided into three resources 321, 322, and 323 (Res2-1, Res2-2, and Res2-3). The divided resources 321, 322, and 323 are respectively allocated to data flows be, bc, and cd. That is, the total size of the resources in this case is Siz1×2+Siz3, which is smaller than that of the resources (Siz1×3) allocated in the art known to the inventors.

In the second embodiment as explained above, the total size of resources can be decreased by allocating the resources by taking account of the data inclusion relation between data flows.

Note that in the second embodiment, "RGB color image" and "grayscale image" are taken as examples of data types having the inclusion relation. However, the present invention is not limited to this. For example, a data flow of a voxel image having W×H×D as width×height×depth can be regarded as D images having W×H as width×height. The data type may also be a combination of any data types such as a structure in the C language, or a series of the same kind of data like an array.

Third Embodiment

The third embodiment according to the present invention will be explained below. The above-described first and second embodiments are examples in which data storages are efficiently allocated by taking account of attribute information (the data size and data type) indicating the features of data in data flows. The third embodiment is an example in which an access attribute indicating a method of access to a resource in a data flow is further given. For example, in some GPUs (Graphical Processing Units), it is possible to access two memories, that is, a normal CPU address space and GPU dedicated address space. Access to the GPU address space has a high speed when accessing large continuous data at once, but has a low speed in random access. If this is the case, it is effective to set a value such as "random access" or "burst access" as an "access pattern" attribute for a data flow, and determine, in accordance with this attribute value, an address space from which a resource is to be secured.

The procedure of a resource allocation method according to the third embodiment will be explained below by taking, as an example, a case in which "random access" and "burst access" are used as two kinds of access pattern attributes. Note that in the third embodiment, the data size attribute is also given to each data flow, as in the first embodiment.

Figure 2B:
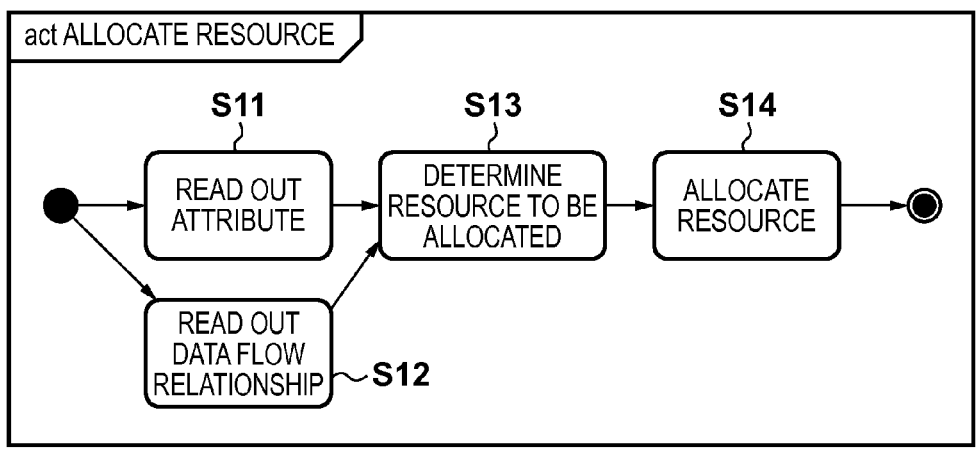
Figure 2C:
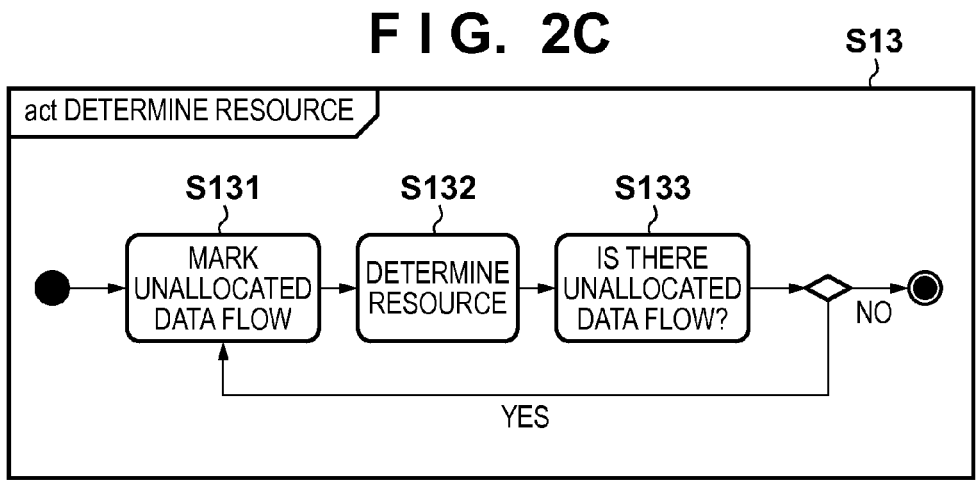
Figure 3:
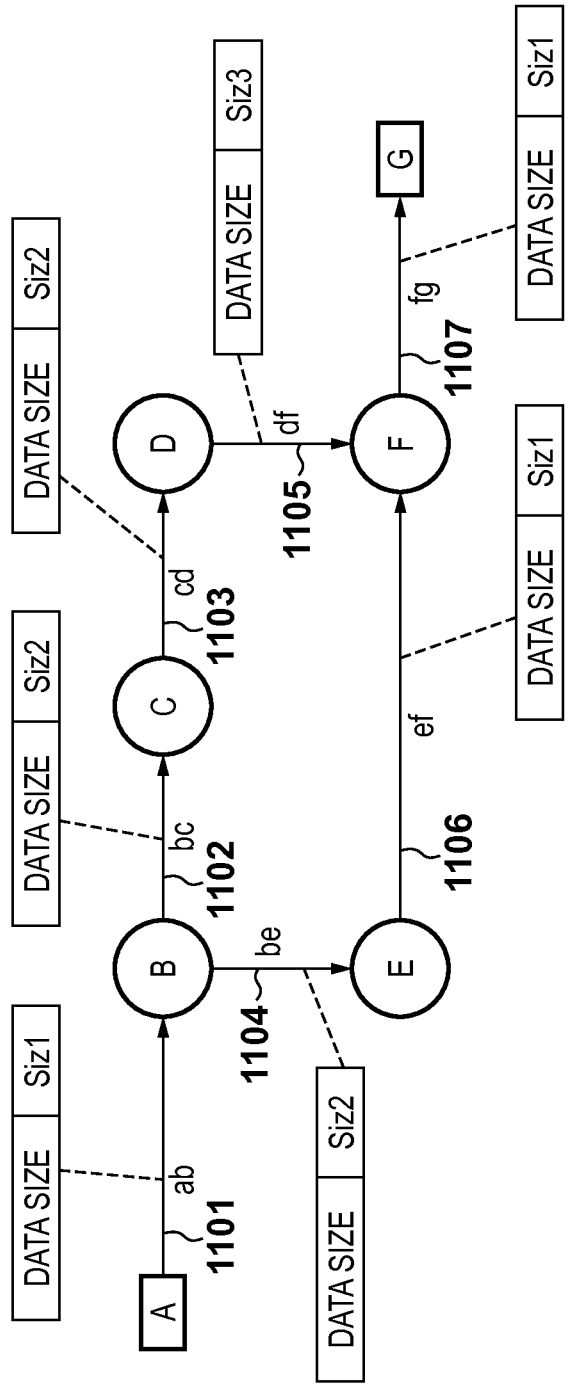
FIG. 3 is a data flow diagram given data size attributes according to the first embodiment.

The data resource allocation method according to the third embodiment is almost the same as that of the above-described first embodiment, except for the details of allocation resource determination step S13 shown in FIG. 2B. That is, a procedure in step S13 of the third embodiment is the similar to that of the first embodiment as shown in FIG. 2C, but details are different.

In the third embodiment, data flow marking in unallocated data flow marking step S131 is performed for each address space, and a resource to be allocated to a data flow is determined for each address space in resource determination step S132.

In unallocated data flow marking step S131, unallocated data flows having "random access" as the "access pattern" attribute are marked in descending order of "data size" attribute value. If there is no more "random access" data flow, "burst access" data flows are then similarly marked in descending order of "data size" attribute value.

In resource determination step S132, resources to be allocated to the data flows having "random access" as the "access pattern" attribute are determined in the CPU address space. On the other hand, resources to be allocated to the data flows having "burst access" as the "access pattern" attribute are determined in the GPU address space. Consequently, resource allocation can be executed at a system execution speed higher than that when resources to be allocated are determined in only the CPU address space or GPU address space.

Also, the execution environment can be an environment including a memory having a limited capacity but a very high speed. In this environment, it is effective to set, for a data flow, a value indicating the degree of the effect of high-speed access as a "high-speed access effect" attribute. In this case, in unallocated data flow marking step S131 shown in FIG. 2C, marking is performed in descending order of "high-speed access effect" attribute value. For example, when 0, 1, and 2 exist as three kinds of "high-speed access effect" attribute values, marking is performed in descending order of "data size" attribute value in a set of data flows having a "high-speed access effect" attribute value of 2. If there is no more data flow having a "high-speed access effect" attribute value of 2, marking is similarly performed for data flows having a "high-speed access effect" attribute value of 1, and finally marking is performed for data flows having a "high-speed access effect" attribute value of 0.

Then, in resource determination step S132, resources are first allocated from a high-speed memory to the data flows. If allocation is impossible because, for example, the capacity of the high-speed memory is insufficient, allocation is performed from a normal memory. Consequently, resource allocation can be performed to increase the execution speed of the system within the range of the capacity of the high-speed memory.

In the third embodiment as explained above, resource allocation can be performed to increase the execution speed of the system by using the attribute representing the method of access to a resource.

Note that the third embodiment is an example in which the execution speed increases, but it is also possible to set the attribute of the method of access to a resource so as to, for example, reduce the power consumption.

Furthermore, the method of access to a resource is not limited to the abovementioned examples. When the system includes a resource suitable for a specific data access method, an index which indicates a priority of allocation based on significance of an effect (for example, the effect of increasing the execution speed, or the effect of reducing the power consumption) when using the resource can be used as an attribute. For example, when the system includes a texture memory, an index for discriminating a data flow to be used in a process of frequently accessing peripheral pixels of a given pixel or a process of interpolating pixel values is set as an attribute. That is, a resource secured in the texture memory can be allocated to the abovementioned data flow discriminated by the attribute with priority. Also, when the system includes a functional memory capable of read-modify-write access at high speed, an index for discriminating a data flow to be used in a process of updating a histogram is set as an attribute. Then, a resource in the functional memory can be allocated with priority to the data flow discriminated by the attribute.

Fourth and Fifth Embodiment

The fourth and fifth embodiment according to the present invention will be explained below. The above-described first, second, and third embodiments are related to examples where the data flow is provided with the attribute including the data size attribute. In the fourth and fifth embodiment, the data flow is provided with an attribute which does not include the data size attribute.

Firstly, the fourth embodiment is described below. The data flow is provided with the data type attribute in the fourth embodiment, while the data flow is provided with the data size attribute and the data type attribute in the second embodiment. The procedure in the fourth embodiment is similar to that of the second embodiment, and the difference between the second embodiment and the fourth embodiment is mainly explained below.

Figure 16:
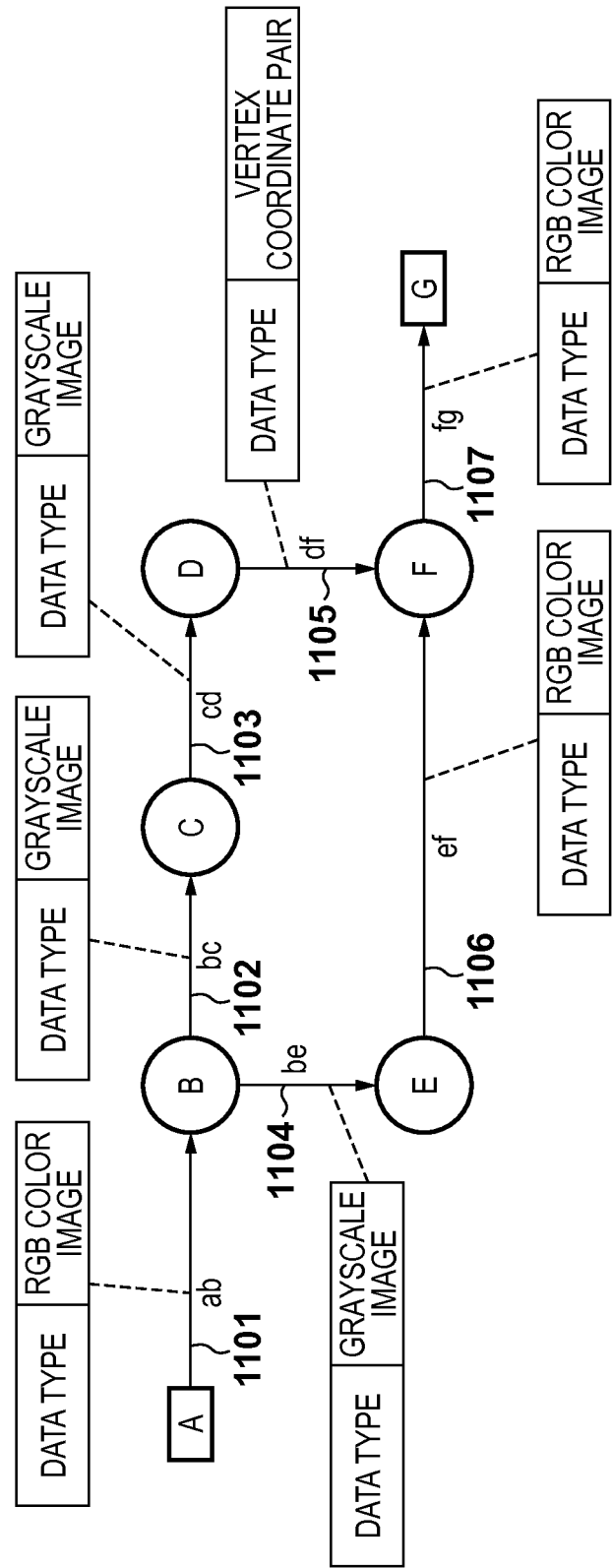
FIG. 16 is a data flow diagram given data type attributes according to the fourth embodiment.

FIG. 16 illustrates attributes provided in the attribute giving step S01 for the data flow diagram. FIG. 16 corresponds to FIG. 10 illustrating the second embodiment. The difference between FIG. 10 and FIG. 16 is that there is not a data size attribute in FIG. 16, in other words, simply a data type attribute is provided for the data flow.

Figures 17A, 17B:
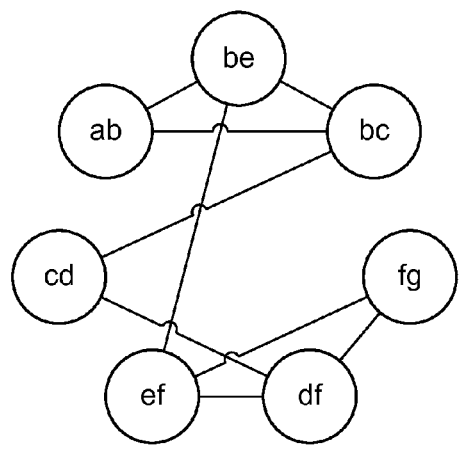
FIGS. 17A and 17B are views showing the resource setting state in the initial stage of the fourth embodiment.

In the attribute read step S11, the data flow attribute table of FIG. 17A is generated. In addition, in the data flow relationship read step S12, the data flow relationship graph of FIG. 17B is generated. FIG. 17A and FIG. 17B correspond to FIG. 11A and FIG. 11B illustrating the second embodiment.

In the data flow attribute table of FIG. 17A, "the number of simple types" attribute, which indicates how many simple types are included in the data type, is used, instead of the data size attribute shown in FIG. 11A. Although the number of simple types attribute is not explicitly provided for the data flow diagram of FIG. 16, the number of simple types attribute is predetermined for each of the data types. In detail, the number of simple types attribute is three, one, and one, for the "RGB color image" data type, the "grayscale image" data type, and the "vertex coordinate pair" data type, respectively. The data flow relationship graph of FIG. 17B is similar to that of FIG. 11B.

The following procedure is similar to the procedure in the second embodiment, however, details of the unallocated data flow marking step S131 and the resource determination step S132 are different from the second embodiment. In the unallocated data flow marking step S131, data flows having a largest "number of simple types" attribute are marked out of the data flows which are not allocated with a resource. In the resource determination step S132, when the resource information of the resource allocated to the data flow is added to the resource table, a value obtained by multiplying a value SizBU with the "number of simple types" attribute is recorded. This value SizBU indicates a size of a resource which is capable of storing any data of the simple type (a resource size of the simple type).

The foregoing procedure is performed with reference to the data flow attribute table of FIG. 17A and the data flow relationship graph of FIG. 17B, and the resource table of FIG. 18A and the data flow attribute table of FIG. 18B are generated as a result of the allocation resource determination step S13. FIG. 18A and FIG. 18B correspond to FIG. 14C and FIG. 14D, respectively.

Figure 19:
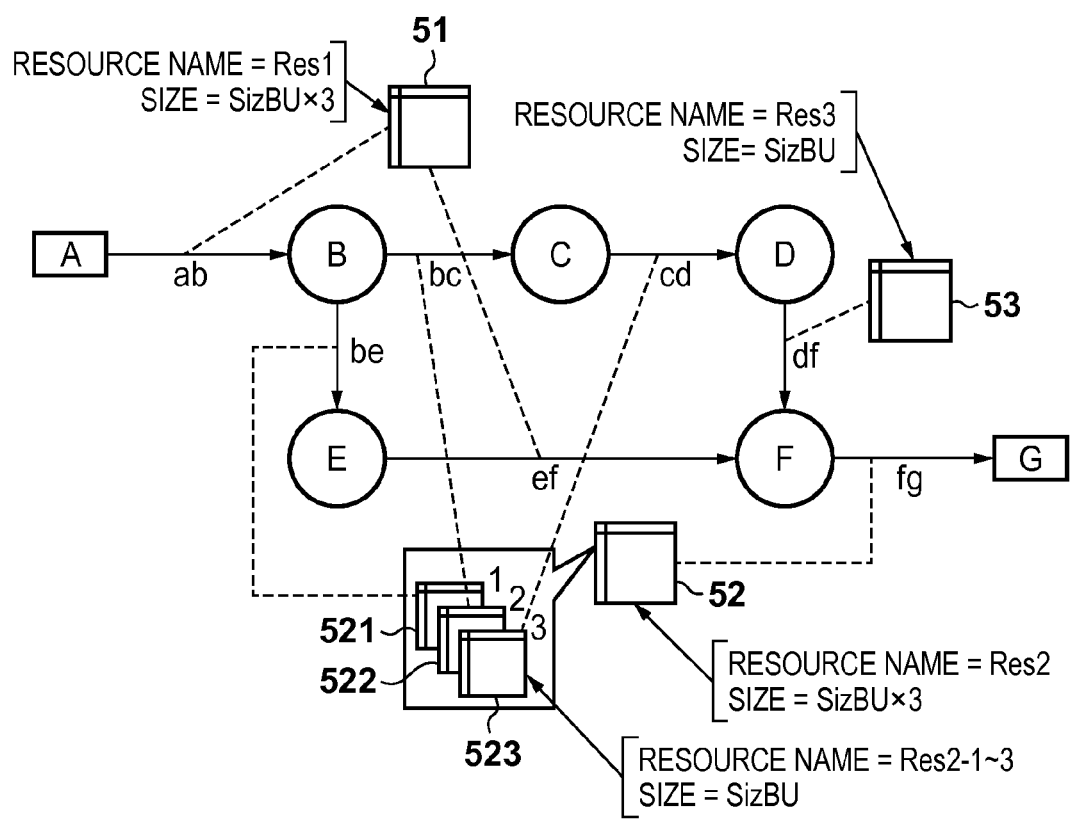
FIG. 19 is a view showing the resource allocation result according to the fourth embodiment.

In the resource allocation step S14, three resources Res1, Res2, and Res3 are secured based on the resource table of FIG. 18A. Then, a resource is allocated for each data flow based on the data flow attribute table of FIG. 18B. FIG. 19 illustrates resource allocation to each data flow. The resource name and the resource size of the resource allocated to each data flow are shown in FIG. 19. FIG. 19 corresponds to FIG. 15 illustrating the second embodiment.

As shown in FIG. 19, two resources Res1 (51) and Res2 (52), which have the size of SizBU×3, and one resource Res 3, which has the size of SizBU, are allocated to the data flows. In addition, the resource Res2 (52) is divided into three resources Res2-1 (521), Res2-2 (522), and Res2-3 (523). These divided resources 521, 522, and 523 are allocated to data flows be, bc, and cd, respectively. As shown in FIG. 19, the total size of the allocated resources is SizBu×7, which is smaller than the total size of the resources (SizBu×9) which are allocated when the art known to the inventors is used.

Secondly, the fifth embodiment is described below. The data flow is provided with the access attribute in the fifth embodiment, while the data flow is provided with the data size attribute and the access attribute in the second embodiment. The procedure in the fifth embodiment is similar to that of the third embodiment, and the difference between the third embodiment and the fifth embodiment is mainly explained below. In detail, details of the unallocated data flow marking step S131 and the resource determination step S132 are different between the third embodiment and the fifth embodiment.

First, an explanation is provided for the case when an "access pattern" attribute is used as the access attribute. It is assumed that the "access pattern" attribute is either a "random access" or a "burst access" below. In this embodiment, data flows which have the "random access" attribute as the "access pattern" attribute are marked in the first unallocated data flow marking step S131. Thereafter, data flows which have the "burst access" attribute as the "access pattern" attribute are marked in the second unallocated data flow marking step S131. This procedure is substantially the same as in the third embodiment when the "data size" attribute is the same for each data flow. In this embodiment, a resource size which enables the resource to store data of any data type is recorded for each data flow, in generating the resource table in the resource determination step S132. On the other hand, in the other embodiment, a resource size which enables the resource to store each data flowing on marked data flow is recorded for each marked data flow.

Also, when a "high-speed access effect" attribute is used as the access attribute, the procedure to be performed is substantially same as that performed in the third embodiment when the "data size" attribute is the same for each data flow.

As explained above, an execution speed can be improved by using the access attribute, in a system comprising a memory suitable for a random access or a burst access, or a high-speed (small) memory.

Furthermore, similar to the third embodiment, an index for discriminating a data flow to be used in a process of frequently accessing peripheral pixels of a given pixel or a process of interpolating pixel values can be used as an attribute. Furthermore, an index for discriminating a data flow to be used in a process of updating a histogram can be used as an attribute. Using these indexes can lead to at least one of an improvement of an execution speed or a reduction in a power consumption.

As described above, it is not necessary to take a size of data flowing on a data flow into account, in determining a resource to be allocated. In other words, it is not necessary to provide a data size attribute for a data flow. As explained above, a resource can be allocated in such a way as to obtain a desired effect, such as a reduction in a necessary resource amount or an improvement in a processing speed, by determining a resource to be allocated taking the attribute provided for a data flow, indicating a requirement for a data storage resource to be allocated, into account. This attribute includes, for example, a data size attribute, a data type attribute, an access pattern attribute, and a high-speed access effect attribute.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-183597, filed Aug. 22, 2012, and 2013-164560, filed Aug. 7, 2013, which are hereby incorporated by reference herein in their entirety.

What is claimed is:

1. A resource allocation apparatus comprising:
   an attribute acquisition unit configured to acquire an attribute provided to a plurality of data flows beforehand, each data flow of the plurality of data flows being a flow of data between a process and another process, wherein the process transfers specific data on a specific data flow to the other process by (a) the process storing the specific data in a data storage resource which is allocated to the specific data flow, and (b) the other process obtaining the specific data from the data storage resource which is allocated to the specific data flow, wherein (1) the attribute indicates a requirement for a data storage resource to store the data flowing on the data flow, and (2) the attribute comprises (a) a data size attribute indicating a data size of the data storage resource required to store the data flowing on the data flow, and (b) a data type attribute which indicates a type of data flowing on the data flow wherein the data type attribute is one of an RGB color image and a grayscale image;
   a graph generation unit configured to generate a data flow relationship graph indicating a relationship between the plurality of data flows which potentially leads to access contention in the data storage resource; and
   an allocation unit configured to, based on the attribute and the data flow relationship graph, allocate the data storage resource to the plurality of data flows such that no access contention occurs upon transferring data on the data flow between the process and the other process.

2. The apparatus according to claim 1, wherein the graph generation unit is further configured to generate the data flow relationship graph which indicates a relationship between data flows, one of which is an input of a process and the other of which is an output of the process, as the relationship between the plurality of data flows which potentially lead to access contention.

3. The apparatus according to claim 1, wherein the attribute further comprises an access attribute which indicates a method of access to the data storage resource storing the data flowing on the data flow.

4. The apparatus according to claim 1, wherein the allocation unit comprises:
   an extraction unit configured to extract a data flow, which has a size attribute indicating a largest data size, from data flows to which the data storage resource is not allocated in the data flow relationship graph, wherein the size attribute indicates a data size of the data storage resource required to store the data flowing on the data flow;
   a coloring unit configured to color the extracted data flow by solving a vertex coloring problem in which the extracted data flow is a vertex; and
   a resource setting unit configured to set a data storage resource for the extracted data flow by setting different data storage resources for different colors.

5. The apparatus according to claim 4, wherein the extraction unit is further configured to repetitively extract a data flow until there is no more data flow to which the data storage resource is not allocated.

6. The apparatus according to claim 4,
   wherein the data type attribute is one of (a) a simple type or (b) a complex type, wherein complex type data comprises a plurality of simple type data, and
   wherein the resource setting unit is further configured to divide a data storage resource set for the data flow with the complex type attribute into a plurality of areas corresponding to the number of simple type data included in the complex type data, and allocate the divided areas to another data flow with the simple type attribute.

7. The apparatus according to claim 4, wherein the attribute further comprises an access attribute indicating a method of access to the data storage resource storing the data flowing on the data flow, and
   wherein the resource setting unit allocates the data storage resource in accordance with the access attribute with priority to the extracted data flow.

8. The resource allocation apparatus according to claim 1, wherein separate data storage resources are allocated to a first data flow and a second data flow of the plurality of data flows, wherein a first process receives the first data flow and outputs the second data flow.

9. The resource allocation apparatus according to claim 1, wherein the allocation unit is further configured to:
   select a first group of data flows based on the attribute of a data flow of the plurality of data flows;
   allocate the data storage resource to each data flow in the first group of data flows;
   select a second group of data flows based on the attribute of a data flow of the plurality of data flows, the members of the first group of data flows being different from the members of the second group of data flows; and
   allocate the data storage resource to each data flow in the second group of data flows.

10. The resource allocation apparatus according to claim 9, wherein the attributes of the first group of data flows indicate a larger size than the attributes of the second group of data flows indicate, and
    wherein the allocation unit is further configured to allocate a first data storage resource or a second data storage resource to a data flow in the second group of data flows, the first data storage resource being allocated to a data flow in the first group of data flows, and the second data storage resource being smaller in size than the first data storage resource.

11. The resource allocation apparatus according to claim 9, wherein the attributes of the first group of data flows indicate a faster access than the attributes of the second group of data flows indicate, and
    wherein the allocation unit is further configured to allocate a first data storage resource or a second storage resource to a data flow in the second group of data flows, the first data storage resource being allocated to a data flow in the first group of data flows, and the second data storage resource being slower in an access than the first data storage resource.

12. The resource allocation apparatus according to claim 1, further comprising a memory as the data storage resource,
    wherein the allocation unit is further configured to allocate the memory to the plurality of data flows.

13. The resource allocation apparatus according to claim 1, wherein the resource allocation apparatus executes processing using a plurality of processes running on the resource allocation apparatus, and the allocation unit is further configured to allocate the data storage resource to the plurality of data flows between the plurality of processes running on the resource allocation apparatus.

14. The resource allocation apparatus according to claim 1, wherein the attribute further comprises a vertex coordinate attribute.

15. A resource allocation method comprising:
    acquiring an attribute provided to a plurality of data flows beforehand, each data flow of the plurality of data flows being a flow of data between a process and another process, wherein the process transfers specific data on a specific data flow to the other process by (a) the process storing the specific data in a data storage resource which is allocated to the specific data flow, and (b) the other process obtaining the specific data from the data storage resource which is allocated to the specific data flow, wherein (1) the attribute indicates a requirement for a data storage resource to store the data flowing on the data flow, and (2) the attribute comprises (a) a data size attribute indicating a data size of the data storage resource required to store the data flowing on the data flow, and (b) a data type attribute which indicates a type of data flowing on the data flow wherein the data type attribute is one of an RGB color image and a grayscale image;
    generating a data flow relationship graph indicating a relationship between the plurality of data flows which potentially leads to access contention in the data storage resource; and
    allocating, based on the attribute and the data flow relationship graph, the data storage resource to the plurality of data flows such that no access contention occurs upon transferring data on the data flow between the process and the other process.

16. A non-transitory computer-readable storage medium storing a program which instructs a computer to:
    acquire an attribute provided to a plurality of data flows beforehand, each data flow of the plurality of data flows being a flow of data between a process and another process, wherein the process transfers specific data on a specific data flow to the other process by (a) the process storing the specific data in a data storage resource which is allocated to the specific data flow, and (b) the other process obtaining the specific data from the data storage resource which is allocated to the specific data flow, wherein (1) the attribute indicates a requirement for a data storage resource to store the data flowing on the data flow, and (2) the attribute comprises (a) a data size attribute indicating a data size of the data storage resource required to store the data flowing on the data flow, and (b) a data type attribute which indicates a type of data flowing on the data flow wherein the data type attribute is one of an RGB color image and a grayscale image;
    generate a data flow relationship graph indicating a relationship between the plurality of data flows which potentially leads to access contention in the data storage resource; and
    allocate, based on the attribute and the data flow relationship graph, the data storage resource to the plurality of data flows such that no access contention occurs upon transferring data on the data flow between the process and the other process.

17. A resource allocation apparatus comprising:
    an attribute acquisition unit configured to acquire an attribute provided to a plurality of data flows beforehand, each data flow of the plurality of data flows being a flow of data between a process and another process, wherein the process transfers specific data on a specific data flow to the other process by (a) the process storing the specific data in a data storage resource which is allocated to the specific data flow, and (b) the other process obtaining the specific data from the data storage resource which is allocated to the specific data flow, wherein (1) the attribute indicates a requirement for a data storage resource to store the data flowing on the data flow, and (2) the attribute comprises an access pattern attribute wherein the access pattern attribute is one of random access and burst access;
    a graph generation unit configured to generate a data flow relationship graph indicating a relationship between the plurality of data flows which potentially leads to access contention in the data storage resource; and
    an allocation unit configured to, based on the attribute and the data flow relationship graph, allocate the data storage resource to the plurality of data flows such that no access contention occurs upon transferring data on the data flow between the process and the other process.

* * * * *